United States Patent
Pirzada et al.

(10) Patent No.: US 8,161,119 B2
(45) Date of Patent: Apr. 17, 2012

(54) NETWORK DEVICE PROVIDED SPAM REPORTING BUTTON FOR INSTANT MESSAGING

(75) Inventors: Shamim Sharifuddin Pirzada, San Jose, CA (US); Anup Venkat Rao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 532 days.

(21) Appl. No.: 11/615,191

(22) Filed: Dec. 22, 2006

(65) Prior Publication Data

US 2008/0155036 A1 Jun. 26, 2008

(51) Int. Cl.
*G06F 15/16* (2006.01)
(52) U.S. Cl. ...................................................... 709/206
(58) Field of Classification Search .................. 709/204, 709/220–226; 358/1.15; 705/6, 1, 28, 26, 705/27, 56, 35, 37, 44, 10; 717/121, 126, 717/177, 101
See application file for complete search history.

(56) References Cited

U.S. PATENT DOCUMENTS

| | | | |
|---|---|---|---|
| 6,006,270 A | 12/1999 | Kobunaya | |
| 6,615,242 B1 * | 9/2003 | Riemers | 709/206 |
| 7,117,358 B2 * | 10/2006 | Bandini et al. | 713/153 |
| 7,197,539 B1 * | 3/2007 | Cooley | 709/206 |
| 7,693,945 B1 * | 4/2010 | Dulitz et al. | 709/206 |
| 2003/0149726 A1 | 8/2003 | Spear | |
| 2004/0199592 A1 | 10/2004 | Gould et al. | |
| 2004/0249893 A1 | 12/2004 | Leeds | |
| 2005/0050148 A1 | 3/2005 | Mohammadioun et al. | |
| 2005/0080642 A1 * | 4/2005 | Daniell | 705/1 |
| 2005/0240617 A1 | 10/2005 | Lund et al. | |
| 2006/0031306 A1 * | 2/2006 | Haverkos | 709/206 |
| 2006/0136590 A1 | 6/2006 | Barrett et al. | |
| 2006/0195589 A1 * | 8/2006 | Vaitl | 709/227 |
| 2006/0253578 A1 * | 11/2006 | Dixon et al. | 709/225 |
| 2007/0124384 A1 * | 5/2007 | Howell et al. | 709/206 |
| 2008/0195709 A1 | 8/2008 | Szeto et al. | |

OTHER PUBLICATIONS

AIM Triton (exe)—TechRepublic—America Online. Jul. 2006. http://software.techrepublic.com.com/download. aspx?docid=241351. Last accessed Jan. 16, 2007.
"U.S. Appl. No. 11/673,261, Response filed Aug. 13, 2009 to Non Final Office Action mailed May 14, 2009", 9 pgs.
"HP Virus Throttle Technology: Stealth Defense Against Malicious Code in Microsoft Windows Environments", http://h20000.www2.hp.com/bc/docs/support/SupportManual/c00369532/c00369532.pdf, (2005), 11 pgs.
Lemos, Robert, "HP aims to throttle Net threats", http://news.zdnet.com/2100-1009_22-5163633.html, (Feb. 23, 2004).
Wong, Cynthia, et al., "A Study of Mass-mailing Worms", http://www.icir.org/vern/worm04/cynthiaw.pdf, Last accessed Apr. 27, 2007.

* cited by examiner

*Primary Examiner* — Joseph Avellino
*Assistant Examiner* — Mark O Afolabi
(74) *Attorney, Agent, or Firm* — Schwegman, Lundberg & Woessner, P.A.

(57) ABSTRACT

In one embodiment, a system can comprise an interface that receives a portion of a messaging communication associated with a client and a tagging component that incorporates a selectable spam identifier into the messaging communication to enable spam detection, the tagging component is independent of the client and a server related to the messaging communication.

22 Claims, 10 Drawing Sheets

NETWORK DEVICE PROVIDED SPAM REPORTING BUTTON FOR INSTANT MESSAGING

TECHNICAL FIELD

The subject disclosure relates generally to securing internal and/or external communication and information transfer.

BACKGROUND

Enterprises employ a vast number of protocols for internal and/or external communications and information transfer in order to ensure reliability, security and compliance with particular policies. For example, internal and/or external communications and information transfer can include, but are not limited to instant messaging (IM), electronic mail (email), Internet Protocol (IP) telephony, web mail, web-browsing, text messaging over a network of two or more computers (or network connectable, processor-based devices), and the like. These electronic communication media are popular as they provide inexpensive, easy, point-to-point communication that is less intrusive than traditional techniques and/or disparate non-electronic communications. There is an abundance of other benefits, for example, instant messaging (IM) is an electronic communication that easily enables one-to-many communication, there is no need to synchronize participants and the content can be planned more easily, among other things. Unfortunately, these media have adversaries and/or protocols that threaten the convenience of and confidence in their use, namely spam, viruses, malware, etc.

A variety of systems and techniques have been developed and employed to combat spam and malicious code related to electronic communication media. With an increase in malicious activity involving spam, viruses, malware, and the like, enterprises are continuously searching for efficient techniques to secure networks and respective data communications associated therewith. Thus, conventional techniques (e.g., content-based filters, IP address-based filters, etc.) are becoming ineffective in recognizing and blocking disguised spam messages in relation to electronic communications. The integrity of enterprises and data communications is imperative to success in which improvements are necessary to ensure security and/or protective techniques are less vulnerable, stronger, and more difficult to penetrate.

DESCRIPTION

Overview

Figure 1:
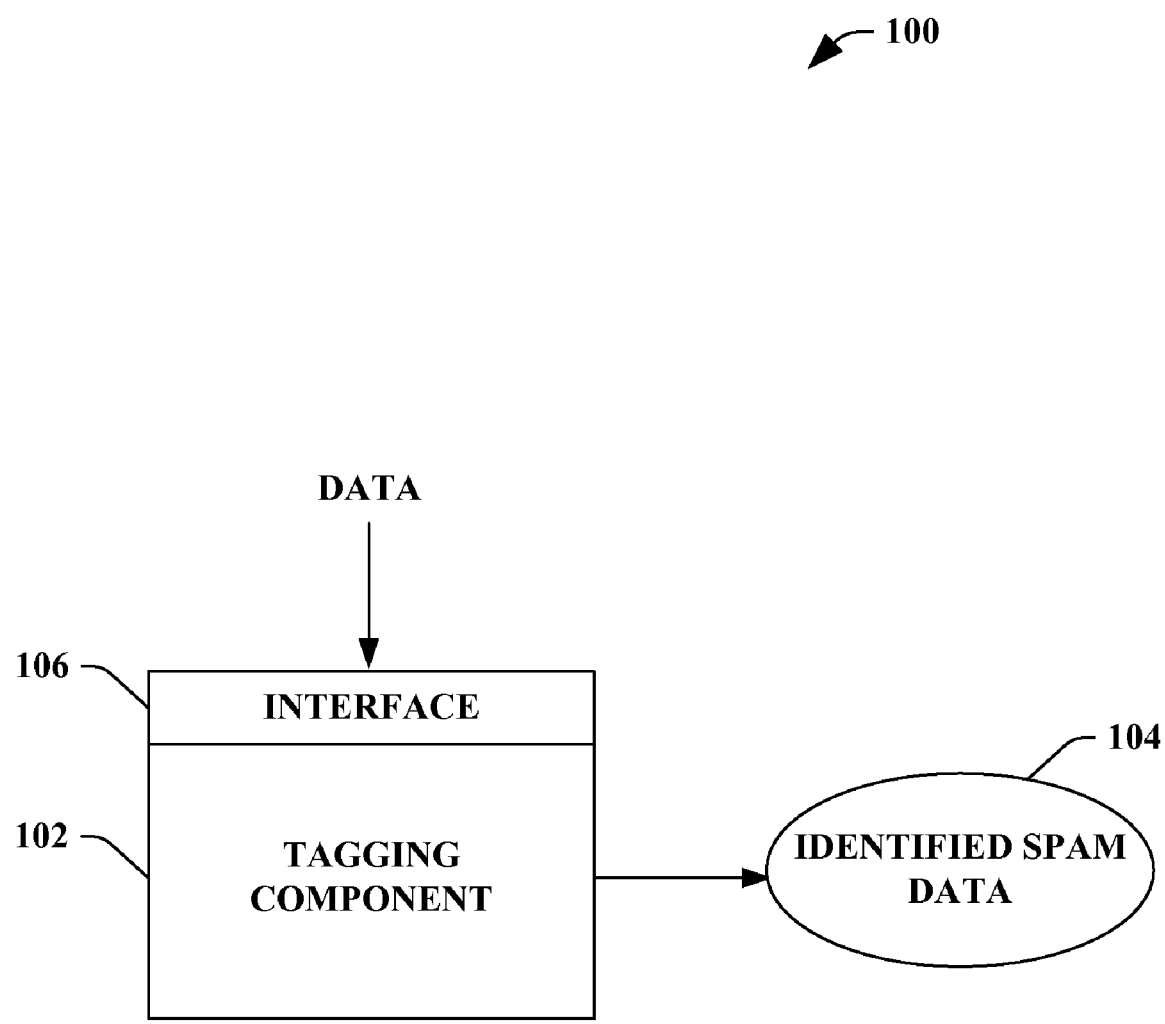
FIG. 1 illustrates a block diagram of an example system that facilitates tagging and/or marking an unwanted data communication within a network independent of a server and a client.

The following presents a simplified overview of the specification in order to provide a basic understanding of some aspects described herein. This overview is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate utilizing tagging an unwanted data communication within a network independent of a server and a client in order to identify spam messaging and/or messages. A system can comprise an interface that receives a portion of a messaging communication associated with a client. A tagging component can incorporate a selectable spam identifier into the messaging communication to enable spam detection, wherein the tagging component is independent of the client and a server related to the messaging communication.

The following description and the annexed drawings set forth in detail certain illustrative aspects of the claimed subject matter. These aspects are indicative, however, of but a few of the various ways in which the principles of the subject matter may be employed and the claimed subject matter is intended to include all such aspects and their equivalents. Other advantages and novel features of the claimed subject matter will become apparent from the following detailed description of example embodiments when considered in conjunction with the drawings.

Description of Example Embodiments

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "network," "client," "server," "communications," and the like are intended to refer to a computer-related entity, either hardware, software (e.g. in execution), and/or firmware. For example, a component can be a process running on a processor, a processor, an object, an executable, a program, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Now turning to the figures, FIG. 1 illustrates a system 100 that facilitates tagging and/or marking an unwanted data communication within a network independent of a server and a client. The system 100 can include a tagging component 102 that can receive data via an interface component 106 (discussed in more detail below), wherein the tagging component 102 can identify spam data 104. In particular, the interface component 106 can receive at least a portion of a messaging communication between a client (not shown) and a server (not shown) such that the tagging component 102 can independently (e.g., in regards to the server and the client) incorporate a spam identifier into the messaging communication. For instance, the messaging communication between the client and the server can be any suitable electronic communication such as, but is not limited to being, electronic mail (email), instant message (IM), short message service (SMS), Internet protocol (IP) telephony, web-browsing, web mail, audio communications, video communications, voice mail, video mail, facsimile, etc. Moreover, it is to be appreciated that the tagging component 102 can implement a spam identifier in connection with a plurality of formats associated with the various messaging communications (e.g. a first instant messaging service with a first format, a second instant messaging service with a second format, etc.).

In one instance, the tagging component 102 can incorporate the spam identifier into the messaging communication by utilizing at least one of a uniform resource locator (URL). For example, a client can receive a messaging communication such as an instant message (e.g., the instant message can be from a first client in a first network transmitted to a disparate client via a server related to such instant message service). The tagging component 102 can embed a URL (e.g., the spam identifier) into the messaging communication and in particular, into a dialog box respective to the client and such messaging communication. Thus, if a client ascertains that a particular messaging communication is a threat, malicious, spam, and the like, the client can select the spam identifier in order to alert the communication as such (e.g., identified spam data 104). Upon such marking and/or tagging of a spam messaging communication, the tagging component 102 can proceed with most any suitable action in order to ensure the integrity of the system 100 (discussed in more detail infra).

In accordance with another aspect of the claimed subject matter, the tagging component 102 can employ a spam identifier as a member (e.g., a virtual member) of a member list utilized by the instant message service. For instance, the tagging component 102 can embed a "identifier" member to a member list independently (e.g., independent of the server and the client), wherein such "identifier" member can be invited to messaging communications that are believed to be spam, a threat, malicious, and the like (e.g. identified spam data 104). Therefore, the system 100 can identify potential threats and/or spam by a client inviting such network-based member to a conversation and/or dialog related to the messaging communication (e.g., audio, video, etc.). In another instance, the virtual member can be a virtual operator that can be invited to collect spam identified messages associated with IP telephony, voicemail, audio, and/or video.

In accordance with still another aspect of the subject innovation, the system 100 can be utilized with IP telephony, wherein the tagging component 102 can incorporate a spam identifier with a phone call and/or voicemail. The voicemail message (e.g., the messaging communication in this example) can be identified by the client with a particular (e.g. pre-determined, etc.) sequence of touch tones and/or IP telephony device (e.g., telephone, wireless phone, and the like) acknowledgement (e.g., key activation, depressing of a button, voice recognition, a touch-screen, handwriting recognition, a technique that acknowledges the identification as spam, etc.). In other words, upon the client listening to the caller and/or a voicemail message, the tagging component 102 can allow the marking and/or tagging of such communication as spam and/or an unwanted solicitation. In another example embodiment, the tagging component 102 can be incorporated and/or associated with a router, data store, a hub, a bridge, a file server, a workstation, a network interface card, a concentrator, a hub, a repeater, and/or any other suitable networking device associated with communications that can be independent of a server and a client. Furthermore, a client can utilize various messaging communications within an environment such as, but not limited to, an office, an enterprise, a company, a warehouse, an automation environment, a home, a network, a school, a university, a library, a small business, any environment that can utilize a messaging communication, etc. For instance, a user can utilize IP telephony, email, and instant messaging on a desktop machine at work and/or home. In general, the messaging communication can relate to most any suitable device that can receive and/or transmit data communications such as, but not limited to, a computer, a machine, a laptop, a PDA, a smart phone, a gaming device, a portable media device, a mobile communication device, a cellular phone, a messaging device, a wireless device, and/or most any device capable of utilizing messaging communications.

In addition, the system 100 can include any suitable and/or necessary interface component 106 (herein referred to as interface 106), which provides various adapters, connectors, channels, communication paths, etc. to integrate the tagging component 102 into virtually any operating and/or database system(s) and/or with one another. In addition, the interface 106 can provide various adapters, connectors, channels, communication paths, etc., that provide for interaction with the tagging component 102, identified spam data 104, a server (not shown), a client (not shown), a messaging communication, and any other device and/or component associated with the system 100.

Figure 2:
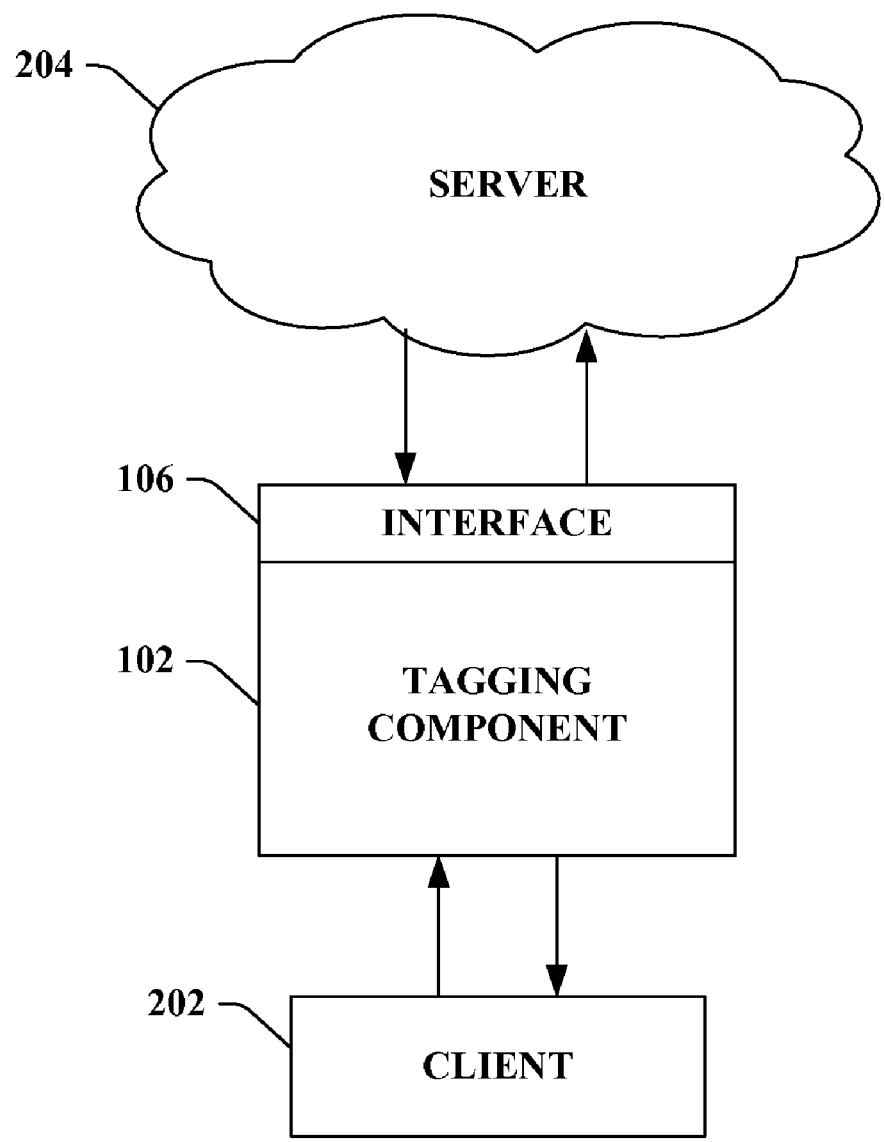
FIG. 2 illustrates a block diagram of an example system that facilitates monitoring data communications independent of a server and a client.

FIG. 2 illustrates a system 200 that facilitates monitoring data communications independent of a server and a client or of peers in a peer to peer communication. The system 200 can include the tagging component 102 that can be independent and separate from a client 202 and a server 204 in order to provide protection by tagging and/or marking spam messaging communications utilizing a spam identifier. The system 200 can include the client 202 that participates in the messaging communication (e.g., receives data, transmits data, and/or any combination thereof), wherein such messaging communication involves the server 204. It is to be appreciated that the server 204 can be most any suitable server that provides a portion of a service in relation to messaging communications. Thus, the server 204 can be related to, electronic mail (email), instant message (IM), short message service (SMS), Internet protocol (IP) telephony, web-browsing, web mail, audio communications, video communications, voice mail, video mail, facsimile, etc.

In another example, the system 200 can employ a uniform resource locator (URL) as a spam identifier by being incorporated into the messaging communication by the tagging component 102. For instance, the URL can be inserted at the start of each incoming conversation (e.g., messaging communication) from an unknown sender. The client can click if it is determines that the conversation and/or messaging communication is spam. By clicking and/or selecting the URL (e.g., the URL can point to the IM proxy), the tagging component 102 can be a proxy that enables the appropriate action to be implemented (discussed in more detail infra).

The system 200 can provide spam identification (e.g., marking, tagging, etc.) by incorporating a spam identifier within messaging communications. Specifically, the tagging component 102 can be a proxy associated with the messaging communication. In one example, the tagging component 102 can employ a virtual member (e.g. owned by the proxy) to a member list such that if the virtual member is invited to a messaging communication (e.g., 1 M conversation), it can be taken as an indication that the client believes it is a spam and/or malicious messaging communication. Thus, the recipient of an unsolicited instant message from the 1 M conversation can invite the virtual member to the conversation if the recipient deems the messaging communication to be spam.

It is to be appreciated that there is no cooperation from the client 202 and/or the server 204. By employing the tagging component 102 in a network (not shown) and/or a network device (not shown), an environment can provide the incorporated spam identifier to most all users, employees, clients, and the like regardless of the messaging communication usage. Moreover, by implementing the tagging component 102 to proxy messaging communication traffic (e.g., email, voice, audio, etc.), there is a better understanding of outbreaks that spam messaging communities (e.g., an outbreak that targets a first instant messaging format, a second instant messaging format, etc.). The claimed subject matter can enable faster convergence than the provider systems (e.g., server-based, instant messaging format service provider-based, etc.) which have access to information from only within their respective communities.

Furthermore, the tagging component 102 can be utilized in most any suitable environment that implements and/or utilizes messaging communications for internal and/or external communications and information transfer. For instance, the system 200 can be employed in an office, an enterprise, a company, a warehouse, an automation environment, a home, a network, a small business, etc. By utilizing the tagging component 102, any messaging communication related to the particular environment (e.g., an office, an enterprise, a company, a warehouse, a home, a network, a small business, etc.) can be protected from spam. In addition, the system 200 can be utilized by a single client rather than being shared across a plurality of clients. Thus, messaging communications identified as spam for a first client may not be identified as spam for a second client. In another example, the system 200 can be employed seamlessly for a plurality of clients. Thus, messaging communications identified as spam for a first client may be identified as spam for the totality of clients within the system 200.

Figure 3:
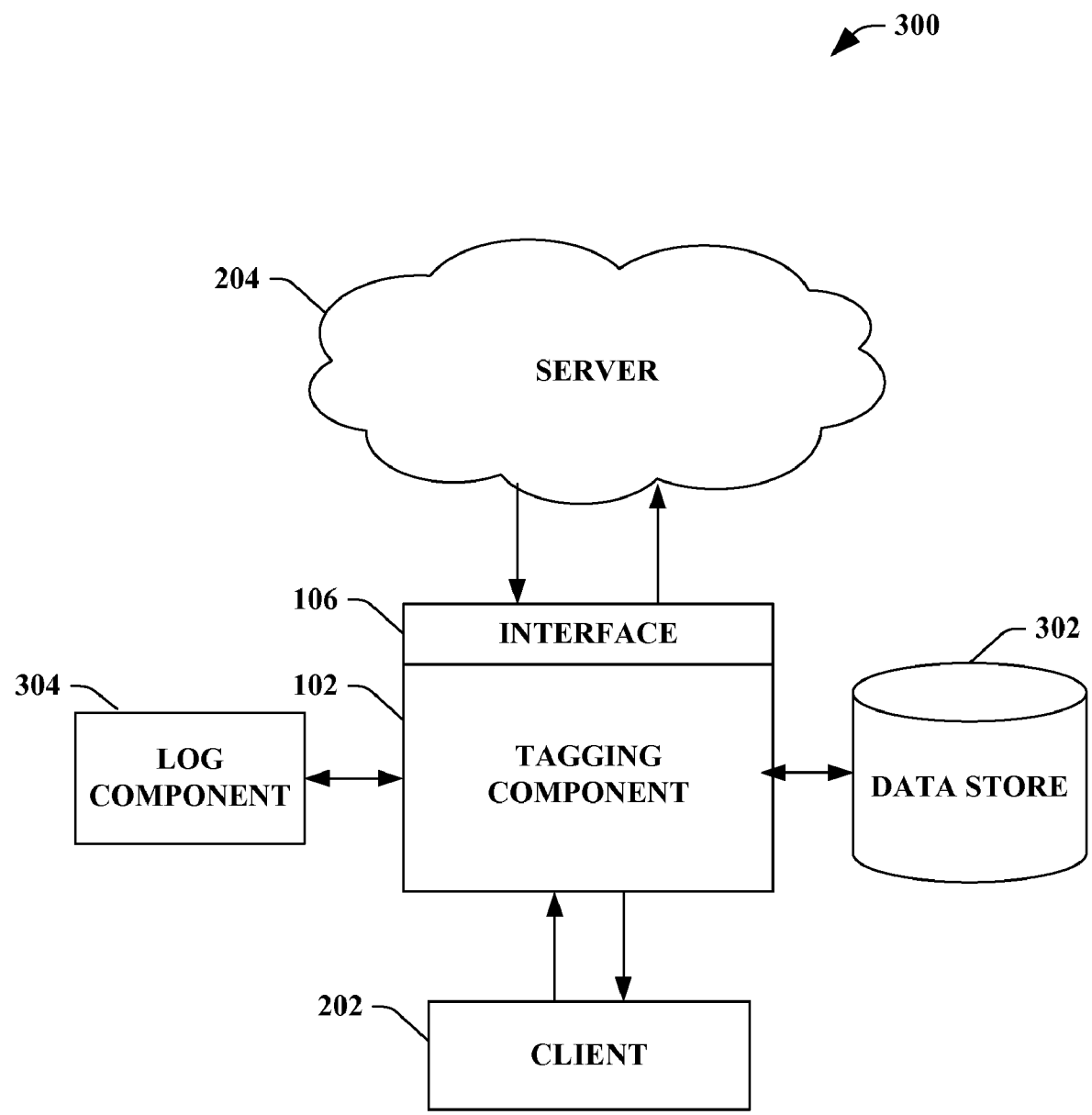
FIG. 3 illustrates a block diagram of an example system that facilitates receiving an marking and/or tagging of a spam message from a client and tracking such markings and/or tags.

FIG. 3 illustrates a system 300 that facilitates receiving a marking and/or tagging of a spam message from a client and tracking such markings and/or tags. The system 300 can include the tagging component 102 that can employ an incorporated spam identifier within a messaging communication, wherein the tagging component 102 is independent of the client 202 and the server 204. In other words, the tagging component 102 can be a messaging communication proxy between the client 202 and the server 204 in order to provide enhanced marking and/or tagging of spam and/or malicious messaging communication. Moreover, upon the employment of the spam identifier within the messaging communication, the client 202 can select and/or activate such spam identifier. Once identified, the system 300 can extract most any suitable information and/or data related to the messaging communication such as, but not limited to, time, recipient, participants within the messaging communication, personas involved within the messaging communication, aliases associated with spam identified messaging communications, etc. (e.g., discussed in more detail infra). In general, the system 300 can glean most any suitable information and/or data related to a spam identified communication in order to provide an action thereto (e.g. repair, isolation, block, containment, quarantine, and the like).

In one example, the system 300 can be provided utilizing the tagging component 102 as a proxy (e.g. IM proxy, email proxy, any suitable messaging communication proxy, etc.). It is to be appreciated that the tagging component 102 can "sit" between the messaging communication client and the messaging communication server (discussed supra). Thus, the tagging component 102 can be in the enterprise and/or environment's network, wherein most any suitable policy can be implemented based on such enterprise and/or environment's preference. It is to be appreciated that the tagging component 102 and/or any other suitable components can be incorporated into most any suitable device, product, software, machine, and the like within a network and/or environment independent of the client 202 and/or the server 204.

The system 300 can further include a data store 302 that can include any suitable data related to the tagging component 102, messaging communications, the client 202, the server 204, etc. For example, the data store 502 can include, but not limited to including, client respective spam markings and/or tags, client specific member lists, client specific preferences, client profiles, client data, client-device data, network settings, email data, IP telephony data, SMS data, web mail data, identified personas, instant messaging data, instant messaging handles, web-browsing data, Internet Protocol (IP) addresses, messaging format data, messaging communications data, historic data related to messaging communications, policies, security measures, protective maintenance, corrective techniques, detected threats, and/or any other data associated with the system 300.

It is to be appreciated that the data store 302 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 302 of the subject systems and methods is intended to comprise, without being limited to, these and any other suitable types of memory. In addition, it is to be appreciated that the data store 302 can be a server, a database, a hard drive, and the like.

The tagging component 102 can further utilize a log component 304 that can track data related to the system 300. In particular, the log component 304 can collect data associated with messaging communications identified with the incorporated spam identifier. The log component 304 can track most any data related to identified/tagged spam messaging communications, wherein the identified spam messaging communications can be specific to each client 202. In another instance, the log component 304 can log identified spam messaging communications for most all clients in order to provide a universal source of identified spam data. It is to be appreciated that the log component 304 can be a stand-alone component, incorporated into the tagging component 102, and/or any combination thereof. The log component 304 can log various information related to spam identified messaging communications. Moreover, the log component 402 can store the logged entries in the data store 302.

Figure 4:
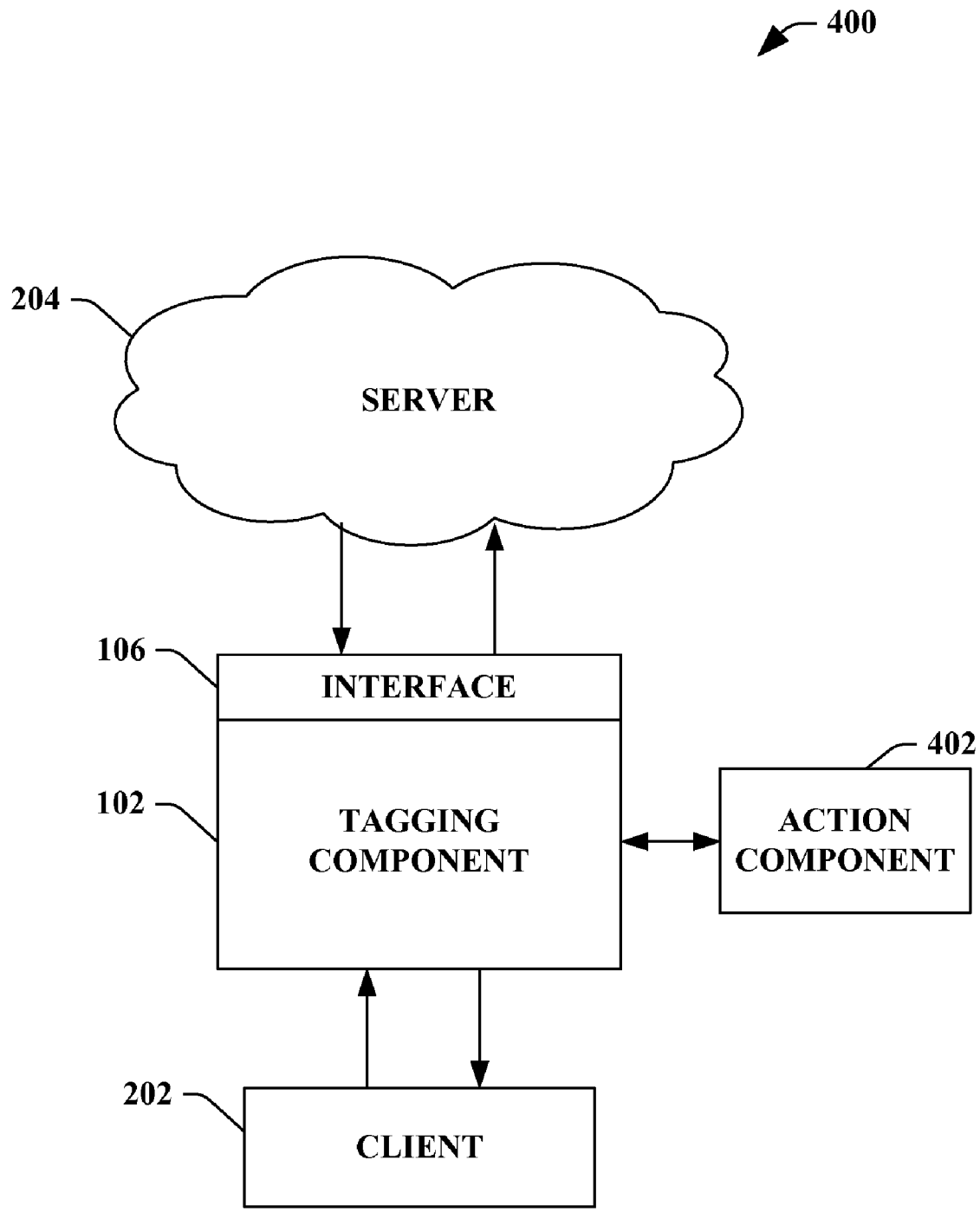
FIG. 4 illustrates a block diagram of an example system that facilitates initiating an action in response to an identified spam message independent of a client and a server.

FIG. 4 illustrates a system 400 that facilitates initiating an action in response to an identified spam message independent of a client and a server. The system 400 can include the tagging component 102 that can receive messaging communication data via the interface 106 such that the tagging component 102 can seamlessly incorporate a spam identifier into the messaging communication to enable the detection of spam, malicious, and/or unwanted messaging communications. The incorporation of the spam identifier into the actual messaging communication provides increased accessibility to the client 202 to identify spam messaging communications and also eases the extraction of most any suitable messaging communication data utilized to implement preventative measures accordingly.

It is to be appreciated that the tagging component 102 can ascertain most any necessary details associated with a spam identified (e.g., via the incorporated spam identifier) messaging communication such as messaging communication handles, aliases, member names, client identification data, client specific member lists, a phone number, an Internet Protocol (IP) address, a cellular phone number, data that identifies a participant in the messaging communication, etc. For instance, upon the marking and/or tagging of a spam messaging communication (e.g., an instant messaging communication) utilizing the spam identifier incorporated into the messaging communication, the tagging component 102 can ascertain that instant messaging service$_1$ handle "maverick" can be handled accordingly based on such marking and/or tagging. It is to be appreciated that the system 400 can identify any suitable personas associated with the identified spam and/or malicious messaging communication. As used herein, it is to be appreciated that a "persona" can refer to an alias, an identity, a role or the like that an individual can assume with various messaging formats.

Moreover, upon such marking and/or tagging of a malicious and/or spam messaging communication, the tagging component 102 can utilize an action component 402 to implement appropriate measures in order to handle such potential threats. The action component 402 can evaluate the identified messaging communication and employ measures such as, but not limited to, blocking the sender/recipient of a spam identified messaging communication, terminating the existence of a participant (e.g. participant can be at least one of a recipient and/or sender of data related to a messaging communication) in the spam identified messaging communication, isolating a participant in the spam identified messaging communication, employing a quarantine to a participant of the spam identified messaging communication, repairing the spam identified messaging communication, and/or most any combination thereof. Furthermore, the action component 402 can evaluate the spam identified messaging communication to initiate a corrective measure and/or protective maintenance to at least one of the client, the tagging component 102, the network (not shown) that can host the tagging component 102 independent of the client 202 and the server 204, the server 204, and/or most any combination thereof. In one example, the action component 402 can provide measures such as, but not limited to, repair instructions, links, help files, and the like.

Figure 5:
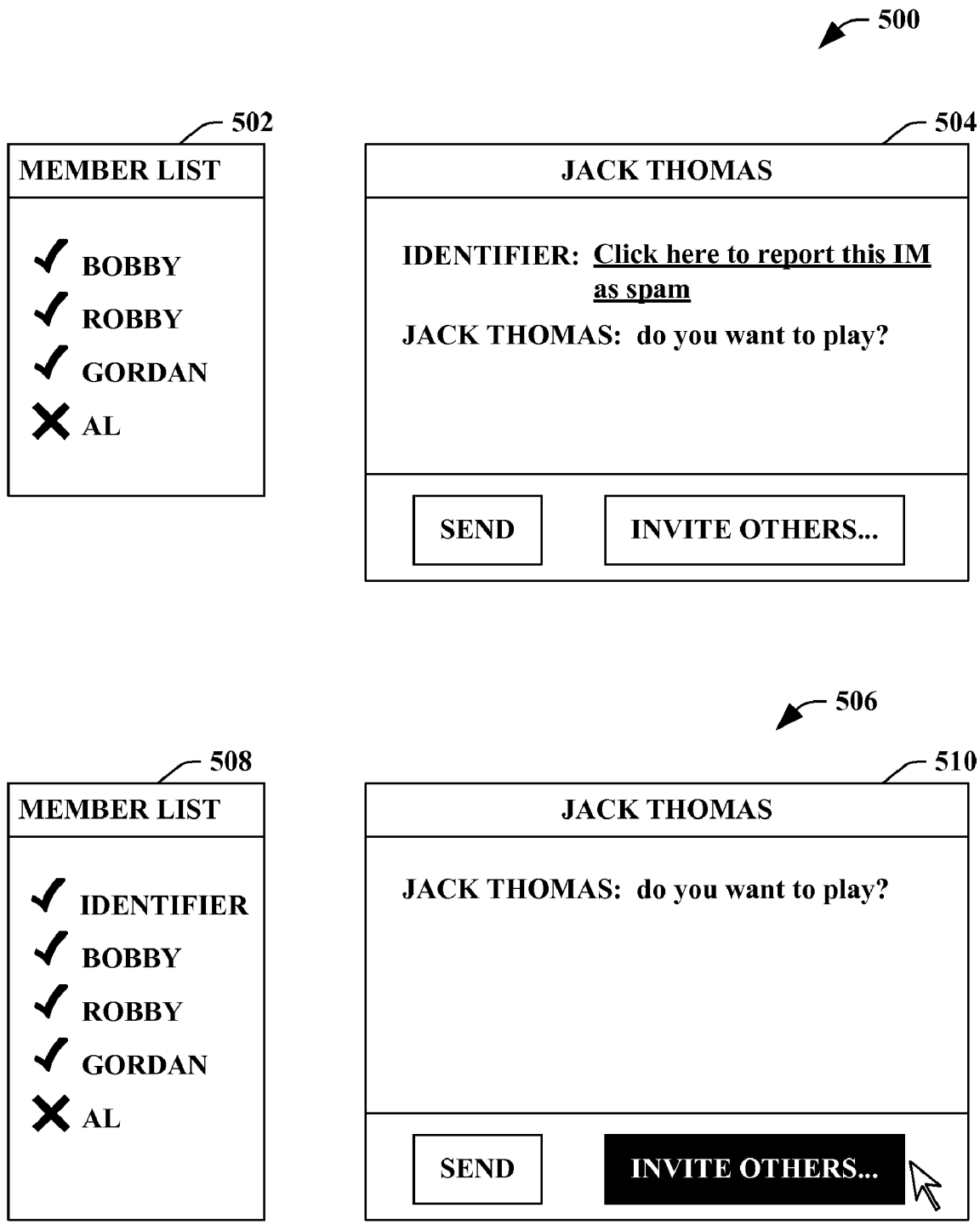
FIG. 5 illustrates a block diagram of an example user interface that facilitates receiving client identification of unwanted data communications.

FIG. 5 illustrates example user interfaces that facilitate receiving client marking and/or tagging of unwanted data communications. A first example user interface 500 is illustrated that incorporates a spam identifier into a messaging communication in order to identify such communication as spam, unwanted, and/or malicious. It is to be appreciated and understood that the example user interfaces illustrated in FIG. 5 relate to messaging communications such as instant messaging, however such claimed subject matter is not so limited to the instant message example.

The first user example interface 500 can include a member list 502 and a conversation 504. The member list 502 can include most any suitable members associated with the instant messaging service, wherein the members can be clients, personas, handles, and/or most any other identification for utilizing such service. In this particular example, the member list 502 includes Bobby (checked as available and/or online), Robby (checked as available and/or online), Gordan (checked as available and/or online), and Al (crossed-out as unavailable and/or off-line). Although there are four members associated with the member list 502, it is to be understood that most any suitable number of members can be employed and only four members are illustrated for the sake of brevity.

The conversation 504 illustrates a message initiated by a "Jack Thomas," wherein such conversation can include an incorporated and/or embedded spam identifier. In the conversation 504, the spam identifier is a uniform resource location (URL) that can be selected and/or clicked on by a client, user, and the like. The URL is identified as a link (e.g., underlined) stating, "Click here to report this IM as spam" from the participant member named "Identifier." The member name (e.g. "Identifier") can be most any suitable name/reference in order to introduce such URL with insurance of validity. Upon selecting the spam identifier (here, the URL), the messaging communication (e.g., instant messaging conversation) can be marked as spam, unwanted, and/or malicious. In one example, most any data related to the participant sending (e.g., "Jack Thomas" in this example) the spam identified messaging communication (e.g., conversation 504) can be extracted utilizing the URL. It is to be appreciated that such spam identifier URL can be incorporated into most any conversation received and/or transmitted.

A second user interface 506 can include a member list 508 and a conversation 510. The member list 508 can include most any suitable members associated with the instant messaging service, wherein the members can be clients, personas, handles, and/or most any other identification for utilizing such service. In this particular example, the member list 508 includes Bobby (checked as available and/or online), Robby (checked as available and/or online), Gordan (checked as available and/or online), and Al (crossed-out as unavailable and/or off-line). Although there are four members associated with the member list 502, it is to be understood that most any suitable number of members can be employed and only four members are illustrated for the sake of brevity.

In addition to the four members on the member list 508, there can be a spam identifier listed as a member (e.g., referenced as "Identifier") that can be invited (e.g., activating, for instance, the "Invite Others . . . " button) to the conversation 510 with "Jack Thomas" in order to identify such messaging communication as spam, unwanted, and/or malicious. It is to be appreciated that the member "Identifier" (e.g., the spam identifier) can be included with most any client and in particular most any member list respective to such client. Moreover, the member "Identifier" can be invited to most any conversation in order to identify such messaging communication as spam, unwanted, and/or malicious.

Figure 6:
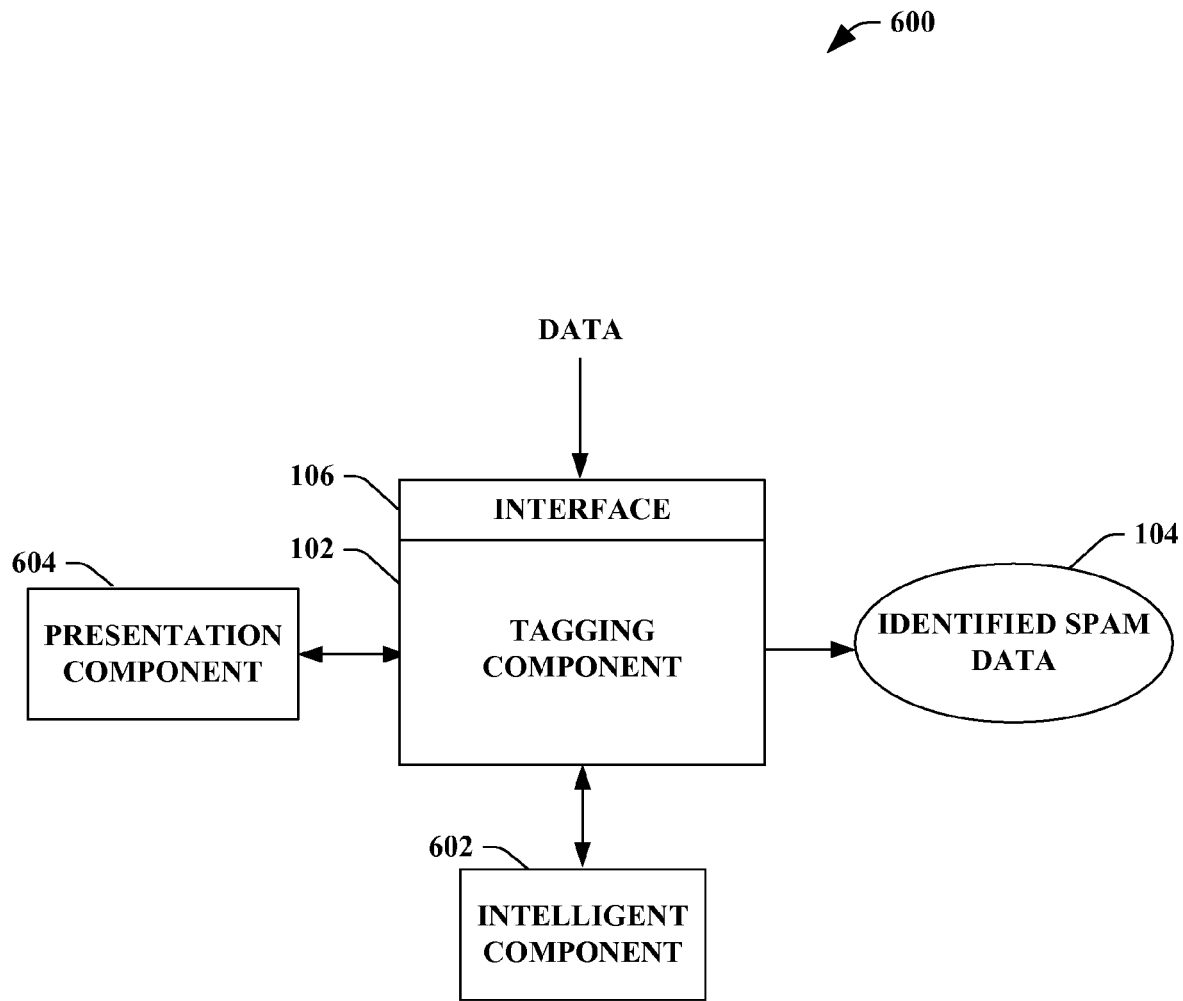
FIG. 6 illustrates a block diagram of an example system that facilitates tagging and/or marking an unwanted data communication.

FIG. 6 illustrates a system 600 that employs intelligence to facilitate tagging and/or marking an unwanted data communication. The system 600 can include the tagging component 102, identified spam data 104, and interface 106 which can be substantially similar to respective components, data, and interfaces described in previous figures. The system 600 further includes an intelligent component 602. The intelligent component 602 can be utilized by the tagging component 102 to incorporate a spam identifier within a messaging communication in order to increase spam awareness, ability, and integrity. For example, the intelligent component 602 can infer what a particular user considers spam with a messaging communication based upon historic data specific to that user, threats, source of threats, personas associated with such detected spam messaging communications, messaging communications utilized, security measures based on identified spam messaging communications, protective maintenance, corrective measures, repair techniques, messaging communication participants, clients, client profiles, client data, device data, email data, SMS data, IP telephony data, web mail data, instant messaging data, instant messaging handles, instant messaging personas, web-browsing data, Internet Protocol (IP) addresses, messaging communications data, messaging data, corrective techniques, repair instructions, server data, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The tagging component 102 can further utilize a presentation component 604 that provides various types of user interfaces to facilitate interaction between a user and any component coupled to the tagging component 102. As depicted, the presentation component 604 is a separate entity that can be utilized with the tagging component 102. However, it is to be appreciated that the presentation component 604 and/or similar view components can be incorporated into the tagging component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the tagging component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
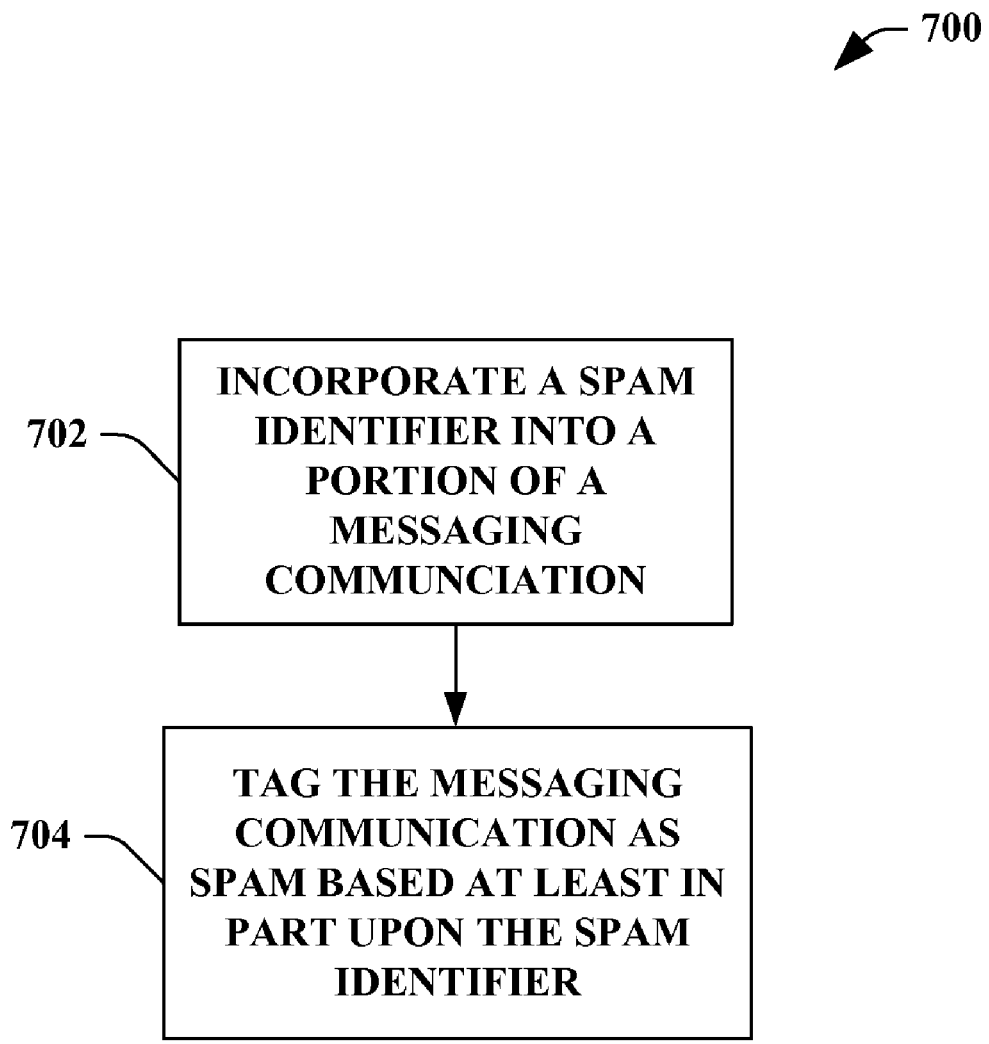
FIG. 7 illustrates an example methodology for monitoring data communications independent of a server and a client.
Figure 8:
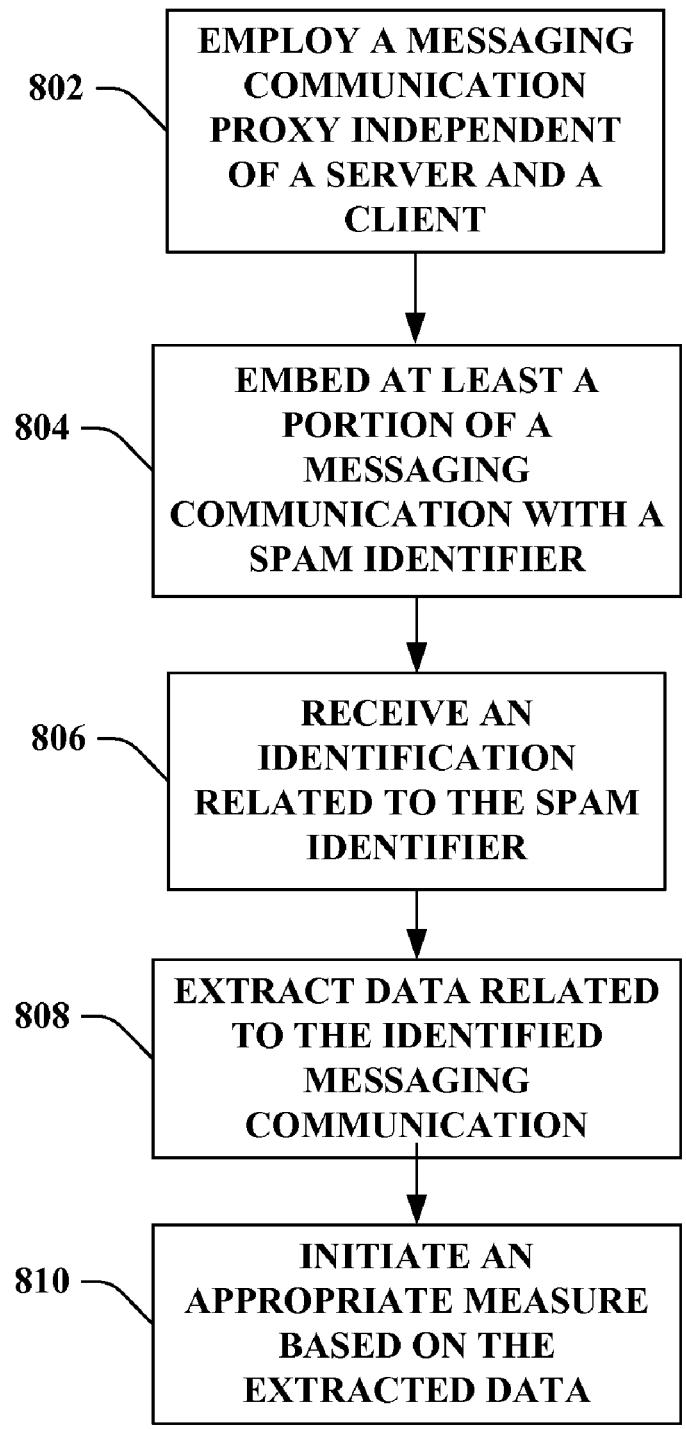
FIG. 8 illustrates an example methodology that facilitates receiving an marking and/or tagging of a spam message from a client and tracking such markings and/or tags.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a methodology 700 for monitoring data communications independent of a server and a client. At reference numeral 702, a spam identifier can be incorporated into a portion of a messaging communication. In one instance, the messaging communication can be between a client and a server, wherein the messaging communication can be any suitable electronic communication such as, but is not limited to being, electronic mail (email), instant message (IM), short message service (SMS), Internet protocol (IP) telephony, web-browsing, web mail, audio communications, video communications, voice mail, video mail, facsimile, etc. It is to be understood that there can be a plurality of messaging communication formats that can be incorporated and/or embedded with the spam identifier. For instance, a first messaging communication format can be embedded with a spam identifier and a second disparate messaging communication format can be embedded with the spam identifier. Furthermore, the spam identifier can be employed with independence in relation to the server and/or the client.

In one example, the spam identifier can be a uniform resource locator (URL) embedded into the messaging communication that can allow the messaging communication to be identified as unwanted, spam, and/or malicious. It is to be appreciated that the spam identifier can be most any suitable URL that can be selectable by a client and/or user. In particular, the URL can be incorporated into the messaging communication at the most any portion of data transmissions (e.g. at the beginning of an IM conversation dialog box, after the data transmission from a sending member of the IM service, at the end of a voicemail message in IP telephony, etc.). In another example, the spam identifier can be a virtual member of a member list corresponding to a messaging communication, wherein upon the invitation of the virtual member, a messaging communication can be identified as spam, unwanted, and/or malicious. In still another example, the spam identifier can be incorporated into a voicemail messaging communication, wherein the client can identify spam messaging with a touch tone and/or IP telephony device (e.g. telephone, wireless phone, and the like) acknowledgement (e.g. key activation, depressing of a button, voice recognition, etc.).

At reference numeral 704, the messaging communication can be tagged and/or marked as spam based at least in part upon the spam identifier. In the example of the spam identifier being a URL, the client/user/employee can select and/or click the URL in order to identify such messaging communication as spam. Such marking and/or tagging can allow the extraction of most any suitable data related to the messaging communication to appropriately handle such communication. When the spam identifier is a virtual member of a member list for a messaging communication service (e.g., instant messaging service, IP telephony service with a virtual operator, etc.), such virtual member can be invited to a particular messaging communication in order to identify the communication as spam. In addition, the spam identifier can be implemented in voicemail and/or IP telephony, wherein the spam identifier can be activated to identify spam with a received acknowledgement (e.g., key activation, depressing of a button, voice recognition, etc.).

FIG. 8 illustrates a methodology 800 that facilitates receiving an marking and/or tagging of a spam message from a client and tracking such markings and/or tags. At reference numeral 802, a messaging communication proxy can be employed independent of a server and a client. The messaging communication proxy can be independent of the server and/or the client, wherein the proxy can enhance the marking and/or tagging of spam messaging communications. It is to be appreciated and understood that the client can participate in the messaging communication (e.g., receives data, transmits data, and/or any combination thereof), wherein such messaging communication can involve a server. Furthermore, the server can be most any suitable server that provides a portion of a service in relation to messaging communications. Thus, the server can be related to, electronic mail (email), instant message (IM), short message service (SMS), Internet protocol (IP) telephony, web-browsing, web mail, audio communications, video communications, voice mail, video mail, facsimile, etc. Additionally, the messaging communication can be related to any environment such that the environment can be, but is not limited to, an office, an enterprise, a company, a warehouse, an automation environment, a home, a network, a small business, etc.

At reference numeral 804, at least a portion of a messaging communication can be embedded with a spam identifier. The spam identifier can be a URL embedded into the messaging communication, a virtual member of a member list related to a messaging communication, and/or a virtual operator of the messaging communication. At reference numeral 806, an identification related to the spam identifier can be received. In particular, the URL can be activated and/or selected to identify spam messaging communications, the virtual member can be invited to the messaging communication to mark as spam, and/or the virtual operator can be acknowledged to mark as spam.

At reference numeral 808, data related to the identified messaging communication can be extracted. Based at least in part upon the spam identifier, most any suitable data can be extracted from the messaging communication. For example, the extracted data can include messaging communication handles, aliases, member names, client identification data, client specific member lists, etc. At reference numeral 810, an appropriate measure can be initiated based at least in part upon the extracted data. For instance, the appropriate measure can be blocking the sender/recipient of a spam identified messaging communication, terminating the existence of a participant (e.g. participant can be at least one of a recipient and/or sender of data related to a messaging communication) in the spam identified messaging communication, isolating a participant in the spam identified messaging communication, employing a quarantine to a participant of the spam identified messaging communication, repairing the spam identified messaging communication, and/or most any combination thereof.

Figure 9:
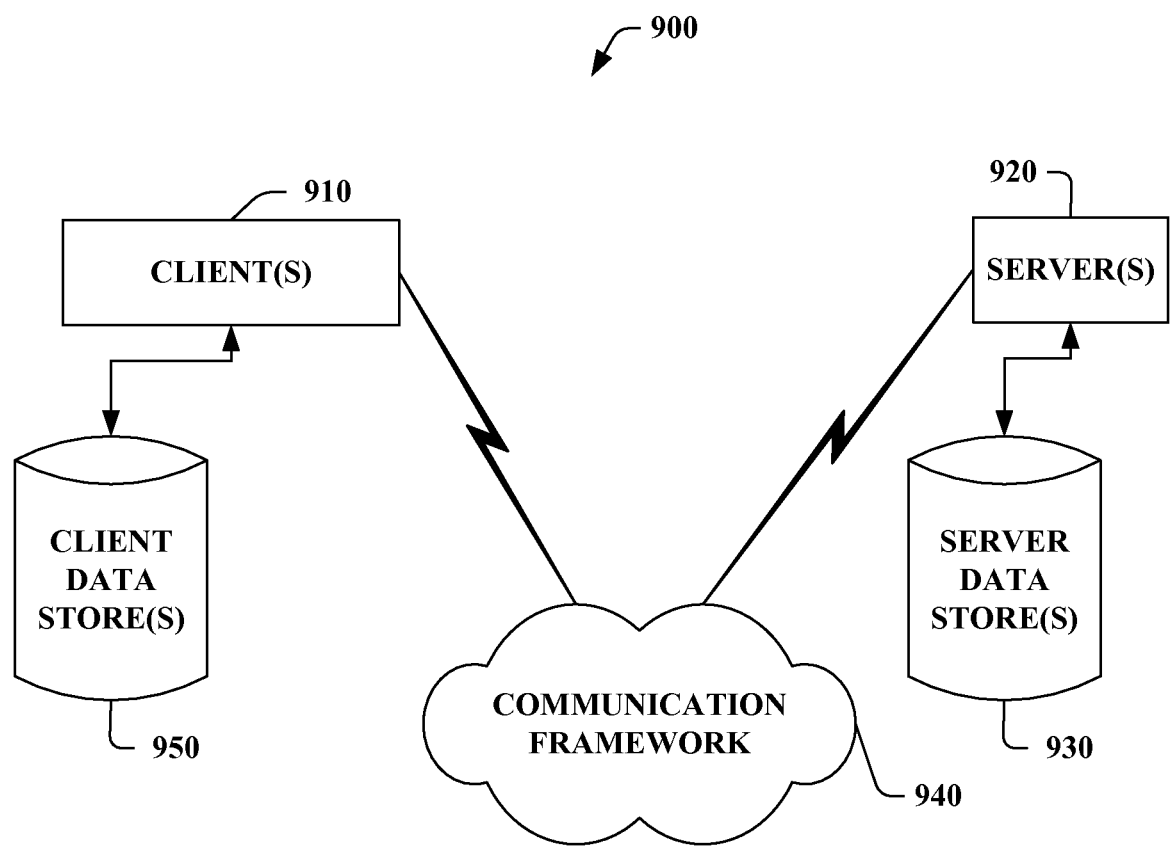
FIG. 9 illustrates an example networking environment, wherein the novel aspects of the claimed subject matter can be employed.
Figure 10:
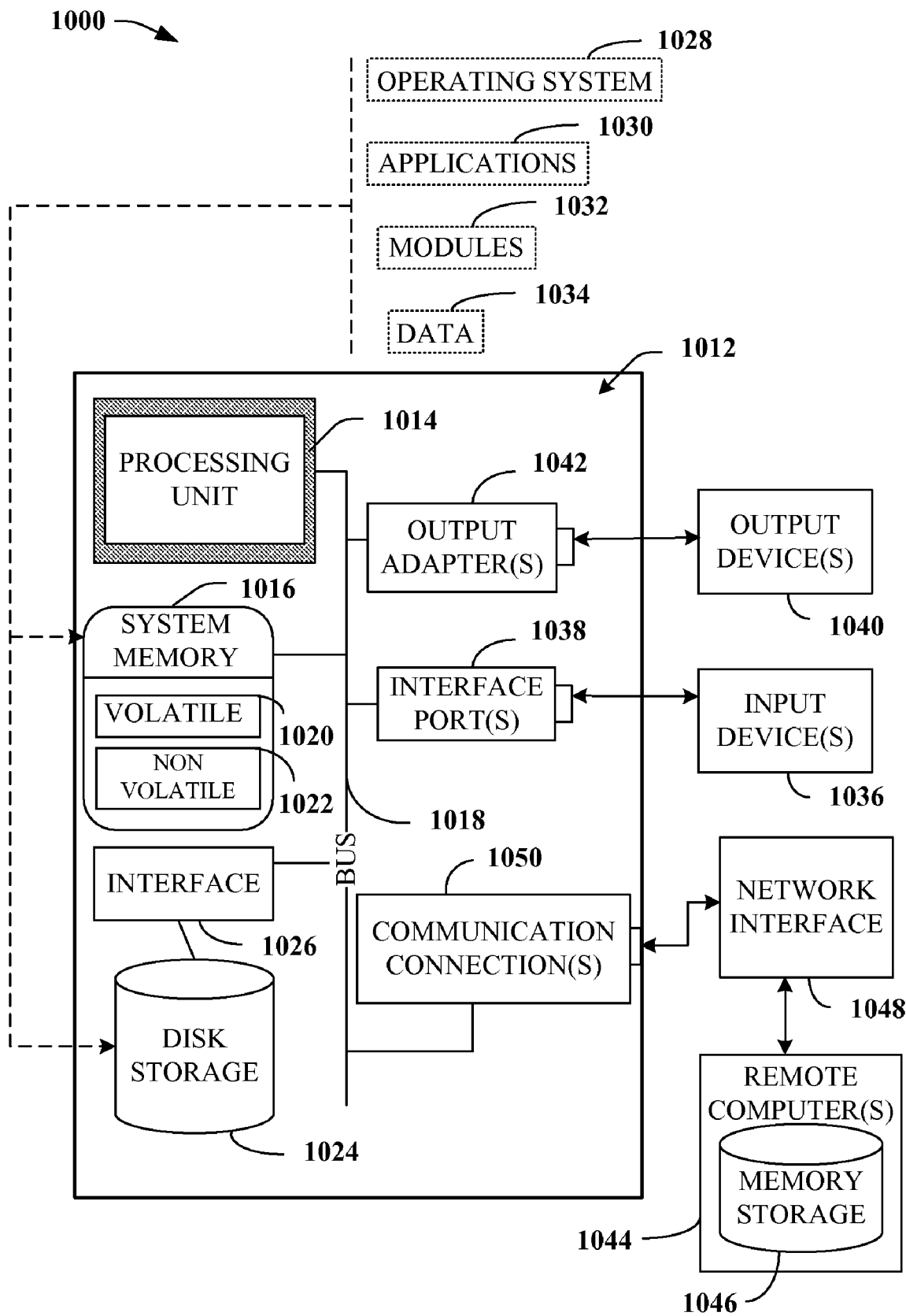
FIG. 10 illustrates an example operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a tagging component that facilitates tagging and/or marking data communications as a threat and/or spam, as described in the previous figures, can be implemented in such suitable computing environment. While the claimed subject matter has been described above in the general context of computer-executable instructions of a computer program that runs on a local computer and/or remote computer, those skilled in the art will recognize that the subject specification also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 940 that can be employed to store information local to the client(s) 910. Similarly, the server(s) 920 are operably connected to one or more server data store(s) 930 that can be employed to store information local to the servers 920.

With reference to FIG. 10, an example environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for example purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functionality performed by the above described components, devices, circuits, systems and the like, the terms (including a reference to a "means") used to describe such components are intended to correspond, unless otherwise indicated, to any component which performs the specified functionality of the described component (e.g., a functional equivalent), even though not structurally equivalent to the disclosed structure, which performs the functionality in the herein illustrated example aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
   memory to store instructions; and
   one or more processors operatively coupled to the memory to execute the instructions to provide:
      an interface component that receives a portion of a messaging communication from a communication server directed to a client; and
      a tagging component that incorporates a selectable spam identifier into the messaging communication to enable spam tagging, the tagging component being in communication with both the client and the communication server within a network and is independent of the client and the communication server within the network or independent of a peer in a peer to peer communication, the tagging component to
      transmit the messaging communication with the incorporated selectable spam identifier to the client,
      receive, from the client, a selection of the selectable spam identifier incorporated into the messaging communication, the selectable spam identifier comprising a virtual member of a member list related to the messaging communication,
      tag the messaging communication as spam based on the received selection of the selectable spam identifier from the client, and
      extract data from the messaging communication identified as spam based on the received selection of the selectable spam identifier from the client.

2. The system of claim 1, wherein the messaging communication is selected from a group consisting of email, short message service (SMS), a peer to peer communication, web mail, Internet Protocol (IP) telephony, video communications, voice mail, video mail, and facsimile, the tagging component allowing the tagging of the select communication as spam.

3. The system of claim 1, the selectable spam identifier comprises a uniform resource locator (URL).

4. The system of claim 3, the URL is embedded into a portion of a dialog box related to the messaging communication.

5. The system of claim 3, the tagging component to tag the messaging communication as spam upon an activation of the URL, the activation of the URL being a selection of the selectable spam identifier.

6. The system of claim 5, the tagging component extracts data associated with the messaging communication based at least in part upon the activation of the URL.

7. The system of claim 1, the tagging component identifies the messaging communication as spam upon an invitation of the virtual member to the messaging communication, the invitation being a selection of the selectable spam identifier.

8. The system of claim 7, the tagging component extracts data associated with the messaging communication based at least in part upon the invitation of the virtual member to the messaging communication.

9. The system of claim 1, the selectable spam identifier comprises a virtual operator.

10. The system of claim 9, the tagging component identifies the messaging communication as spam upon a transmission related to the messaging communication received by the virtual operator, the transmission being a selection of the selectable spam identifier.

11. The system of claim 10, the transmission is transmitted via a device, the transmission is acknowledged by at least one of a key activation, a depressing of a button, a touch-screen, handwriting recognition, a technique that acknowledges the identification as spam, or a voice recognition.

12. The system of claim 11, the tagging component extracts data associated with the messaging communication based at least in part upon the transmission of the messaging communication to the virtual operator.

13. The system of claim 1, the messaging communication relates to at least one of a computer, a machine, a laptop, a portable digital assistant (PDA), a smart phone, a gaming device, a portable media device, a mobile communication device, a cellular phone, a messaging device, a wireless device, or a device that employs a messaging communication.

14. The system of claim 1, the tagging component gleans at least one of a messaging communication handle, an alias, a member name, client identification data, a client specific member list, a phone number, an Internet Protocol (IP) address, a cellular phone number, or data that identifies a participant in the messaging communication.

15. The system of claim 1, further comprising a log component that collects data associated with the messaging communication identified as spam based upon the selectable spam identifier.

16. The system of claim 1, further comprising an action component that employs an appropriate measure, the appropriate measure is at least one of the following: a block of a participant of a spam identified messaging communication; or a termination of a participant in a spam identified messaging communication.

17. A method, comprising:
receiving a portion of a messaging communication from a communication server within an enterprise, the messaging communication being directed to a client;
incorporating a selectable spam identifier into the portion of the messaging communication directed to the client, the incorporating of the selectable spam identifier being performed by a component in communication with both the client and the communication server within a network and independent of the client and the communication server within the network;
transmitting the portion of the messaging communication with the incorporated selectable spam identifier from the component to the client;
receiving, from the client, a selection of the selectable spam identifier incorporated into the portion of the messaging communication, the selectable spam identifier comprising a virtual member of a member list related to the messaging communication;
tagging the messaging communication as spam based on the receiving of the selection of the selectable spam identifier from the client; and
extracting, by the component, data from the messaging communication tagged as spam based on the receiving of the selection of the selectable spam identifier from the client.

18. The method of claim 17, further comprising:
employing the spam identifier as a messaging communication proxy independent of a server and a client;
employing the spam identifier as a messaging communication proxy in a peer to peer communication;
receiving an activation of the spam identifier; and
initiating an appropriate measure based on the extracted data.

19. A network element, comprising:
memory to store instructions; and
one or more processors operatively coupled to the memory to execute the instructions to provide:
an interface that receives a portion of a messaging communication from a communication server directed to a client; and
a tagging component in communication with both the client and the communication server within a network and is independent of the communication server providing service related to the messaging communication within the network and the client, the tagging component incorporating a selectable spam identifier into the messaging communication to enable spam tagging, the messaging communication is at least one of email, instant messaging, a peer to peer communication, web mail, short message service (SMS), Internet Protocol (IP) telephony, audio communications, video communications, voice mail, video mail, or facsimile, the tagging component to
transmit the messaging communication with the incorporated selectable spam identifier to the client,
receive, from the client, a selection of the selectable spam identifier incorporated into the messaging communication, the selectable spam identifier comprising a virtual member of a member list related to the messaging communication,
tag the messaging communication as spam based on the received selection of the selectable spam identifier from the client, and
extract data from the messaging communication identified as spam based on the received selection of the selectable spam identifier from the client.

20. The system of claim 1, further comprising an intelligent component configured to infer what the user considers spam with the messaging communication based upon historic data specific to the user.

21. The system of claim 1, wherein the messaging communication is an audio communication, the tagging component allowing the tagging of the audio communication as spam.

22. The system of claim 1, wherein the messaging communication is an instant message, the tagging component allowing the tagging of the instant message as spam.

* * * * *